United States Patent [19]

Wolfer et al.

[11] 3,737,853

[45] June 5, 1973

[54] APPARATUS FOR SENSING AND PROCESSING MISSING OR ERRONEOUSLY RECORDED INFORMATION

[75] Inventors: Allan J. Wolfer, La Jolla; Edward Cooper, San Diego, both of Calif.

[73] Assignee: Eastman Kodak Company, Rochester, N.Y.

[22] Filed: Oct. 27, 1971

[21] Appl. No.: 192,837

[52] U.S. Cl. ........................340/146.1 F, 340/174.1 B

[51] Int. Cl. ............................G06f 11/10, G06k 5/04

[58] Field of Search ..................340/146.1 F, 174.1 B

[56] References Cited

UNITED STATES PATENTS

| | | | |
|---|---|---|---|
| 3,142,829 | 7/1964 | Comstock | 340/146.1 F |
| 3,193,812 | 7/1965 | Friend | 340/146.1 F |
| 3,439,331 | 4/1969 | Brown et al. | 340/174.1 B |
| 3,509,531 | 4/1970 | Wilinson et al. | 340/174.1 B |

*Primary Examiner*—Charles E. Atkinson
*Attorney*—W. H. J. Kline and Raymond L. Owens

[57] ABSTRACT

Apparatus for sensing and processing missing or erroneously recorded phase encoded binary information recorded upon a plurality of tracks of a suitable information storage medium such as a magnetic tape. Each track is recorded with binary information taking the form of periodically spaced, information bearing significant transitions and non-significant transitions spaced therebetween. The significant transitions are stored upon a first plurality of storage devices associated with each of the tracks. If a significant transition is erroneously recorded or is missing, this error condition is sensed and is stored upon a second plurality of storage devices associated with each of the tracks. The corresponding significant transitions recorded on each of the tracks comprise a byte of information. The information bits and error condition signal are stored for a sufficient length of time to permit information bits corresponding to each of the significant transitions of the byte of information to be placed upon the first plurality of storage devices and for the signal(s) indicating an error condition to be placed upon the second plurality of storage devices. Then, the information bits and error condition signals if any, are read out in synchronism.

5 Claims, 12 Drawing Figures

EDWARD COOPER
ALLAN J. WOLFER
INVENTORS

BY Raymond S. Owen
W. W. J. Kline
ATTORNEYS

Patented June 5, 1973 3,737,853

6 Sheets-Sheet 2

EDWARD COOPER
ALLAN J. WOLFER
INVENTORS

BY Raymond L. Owens

W. H. J. Kline

ATTORNEYS

Patented June 5, 1973 3,737,853

6 Sheets-Sheet 3

EDWARD COOPER
ALLAN J. WOLFER
INVENTORS

BY Raymond J. Owens
W. H. J. Kline
ATTORNEYS

EDWARD COOPER
ALLAN J. WOLFER
INVENTORS
BY Raymond L. Owens
W. H. J. Kline
ATTORNEYS

EDWARD COOPER
ALLAN J. WOLFER
INVENTORS

BY Raymond L. Owens
W. H. J. Kline
ATTORNEYS

EDWARD COOPER
ALLAN J. WOLFER
INVENTORS
BY Raymond S. Owens
W. H. J. Kline
ATTORNEYS

APPARATUS FOR SENSING AND PROCESSING MISSING OR ERRONEOUSLY RECORDED INFORMATION

CROSS REFERENCE TO RELATED APPLICATIONS

Reference is made to commonly assigned copending U. S. application Ser. No. 192,861, entitled, APPARATUS FOR HANDLING PHASE ENCODED BINARY INFORMATION, filed in the names of Wolfer and Cooper ; to commonly assigned copending U. S. Pat. application Ser. No. 192,836, entitled, APPARATUS FOR SELECTING A MASTER CLOCK SIGNAL FROM A PLURALITY OF CLOCK SIGNALS, filed in the names of Wolfer and Cooper ; and to commonly assigned copending U. S. Pat. application Ser. No. 192,865, entitled, APPARATUS FOR DETECTING AND CORRECTING ERRORS IN BINARY INFORMATION RECORDED ON A PLURAL TRACK MEDIUM.

BACKGROUND OF THE INVENTION

This invention relates to apparatus for decoding phase encoded binary information from a plurality of tracks recorded upon an information storage medium such as a magnetic tape.

Description of the Prior Art

It is well known in the art to record information in a binary system in which characters or other information may be recorded in terms of 1's and 0's. More specifically, a character may be recorded upon a suitable storage medium such as magnetic tape in terms of a group (hereinafter referred to as a byte but which is often described as a "character" in the art) of bits, which bits take the form of 1's or 0's. Phase encoded binary information is often used and may take various forms known in the art. In one such form which is used commercially, a series of binary bits, i.e., 1's and 0's are recorded in a train of signal transitions (or reversals) from a first or low level to a second or high level. Each such transition is recorded or disposed within a predetermined period, which will be referred to herein as a digit period, although it is sometimes referred to in the art as a bit cell. In particular, binary signals indicative of 1's may be considered to comprise reversals going in a first direction from a first level to a second level, while binary signals indicative of 0's may be considered to comprise reversals in the opposite direction from the second level to the first level. With reference to FIG. 3 of the drawings, there is shown a phase encoded signal in which binary 1 signals are indicated by a positive going reversal and binary 0 signals indicative by a negative going signal.

As shown in FIG. 3A, the significant or information bearing transitions, i.e., the positive and negative going reversals are indicative respectively of 1 and 0 binary signals, are disposed substantially midway within a digit period. Further, it is noted that the signal has other reversals at the boundary between certain digit periods which are not information bearing signals. For example, between the positive going reversals occurring at the times $t_1$ and $t_2$, there is a negative going reversal in order that a positive going reversal may occur at time $t_2$. Thus, where two consecutive signals are of the same type, there must be a reversal at the boundary between digit periods. Although such reversals are important since they are not indicative of binary information they will be termed herein a non-significant reversal, which terminology is with reference to this lack of binary information content.

In order to distinguish the significant from the non-significant reversals, it is necessary to sample or to gate the phase encoded signal so as to only detect the significant reversal indicative of the recorded information. For example, the phase encoded signal shown in FIG. 3 could be applied to an AND gate which would be periodically enabled for a predetermined time interval within each digit period so that only the significant reversals at times $t_1$, $t_2$, $t_3$ . . . would be processed thereby preventing sampling of the non-significant reversals. Such a predetermined time interval is sometimes referred to as a sample window or aperture. One characteristic of the phase encoded signal is that it may be considered to be "self-clocking". By self-clocking, it is meant that the information bearing signal may be used to generate a regular, periodic clock signal without recording a separate clock signal upon an additional track of the information storage medium. Further, the self clocking signal may be used for generating enabling or aperture signals to be applied to the AND gate to examine (or sample) the phase encoded signal at times $t_1$, $t_2$, $t_3$ . . . as just explained. With regard to FIG. 3, the phase encoded signal provides either positive or negative going transitions at regular periodic intervals disposed halfway between the digit periods. The significant reversals are intended to be regularly spaced and may be used as a clock signal to time the various operations of the information handling apparatus including the sampling of the phase encoded signal. U. S. Pat. No. 2,700,155 shows the detection of the regular periodic reversals of a phase encoded signal for the purpose of sampling the signal.

Illustratively, a phase encoded signal on each track of a medium may be recorded in defined blocks of information including a preamble and a postamble to indicate the passing of the block of information. In order to synchronize time and phase of the gating of the phase encoded signal to sense the significant reversals, the preamble may be used to set the clock and gating circuits to open the sample window gate at times $t_1$, $t_2$, $t_3$, etc. For example the preamble comprises a predetermined format and in one illustrative embodiment, may be composed of all 1 or all 0 signals followed by a single signal of the opposite going polarity. In addition, the preamble may function to synchronize a clock circuit or oscillator so that as the information block passes the read out mechanism, the AND or other gating circuit will be enabled to read out the significant reversals of the phase encoded signal. After reading out the phase encoded signals from the information block, a postamble signal may be provided to notify the information handling apparatus that an information block has passed.

Phase encoded signals may be recorded on a plurality of tracks upon a suitable information storage medium such as magnetic tape. As indicated above, binary information may be indicated as either a 1 or a 0 bit. The use of a plurality of tracks enables the user to record a group or byte of bits in each of the plurality of tracks. The information bits of a byte may be read out simultaneously and sensed to indicate a particular alphanumeric character or other quantum of information. One advantage of a phase encoded signal, is that a high density of information may be recorded on the information storage medium. However, the high density of storing information creates problems due to the skew between bits of a single byte of information recorded on the plurality of tracks. For example, a bit of information recorded in a first track disposed on one edge of the information storage media must correspond with a bit (of the same byte) recorded in the last track disposed on the other edge of the medium. In recording such signals on a plurality of tracks, it is desired that each bit of a byte be recorded in synchronism with the remaining bits, i.e., the bits of a byte are recorded substantially in a line perpendicular with respect to the direction in which the information storage tape is moved. As a result, if the recording or reading heads are misplaced or the storage medium is subsequently stretched or distorted, the bits of a single byte may not be read out in synchronism, i.e., simultaneously, and as a result, bits of one byte may be confused with the bits of an adjacent byte.

As disclosed in the above-identified copending application entitled, APPARATUS FOR HANDLING PHASE ENCODED BINARY INFORMATION, the bits of information recorded upon each of the tracks may be stored upon a plurality of storage devices associated with each of the tracks. The bits of information are stored for a period of time sufficient to permit the bits of information to be read from each of the tracks of the storage medium and to be stored upon the corresponding plurality of storage devices. After a sufficient delay a read or clock signal may be applied to the corresponding storage devices of each of the tracks and the bits of information corresponding to a single byte are then read out in synchronism. However, errors may occur either in the recording or in the reading out of information from the plurality track medium. More specifically, the binary information is recorded on each of the tracks in the form of a periodically spaced significant transitions and non-significant transitions disposed therein. It may be understood that only the significant transitions contain the information recorded upon the tracks. Illustratively, a suitable clock signal may be generated from this type of recording and is used to sample the significant transitions to derive bits of information according to the type, either 1 or 0 of information. An error condition may occur when the significant transition is missing. The problems arise of how to process the missing significant transition and how to correlate the missing transition with the reading out of the remaining correct bits of information of a byte.

SUMMARY OF THE INVENTION

It is therefore an object of this invention to sense and to process missing or erroneously recorded information derived from a plurality of tracks.

It is a more specific object of this invention to sense missing or erroneously recorded significant transitions of a phase encoded signal recorded upon a plurality of tracks of information and for providing an indication of such error conditions in synchronism with providing or reading out of the information bits which comprise a single byte of information.

In accordance with these and other objects, the teachings of this invention are accomplished by providing information handling apparatus including a first plurality of storage devices associated with each of the tracks for storing in order successive bits of information derived from its corresponding track, error detection means responsive to an erroneously recorded or missing bit of information for providing an indication thereof, a second plurality of storage devices associated with each of the tracks for receiving and storing the indication of an error condition in that particular track, and read out means for deriving substantially simultaneously from the first and second plurality of storage devices signals corresponding to the stored information bits and a signal(s) indicating the error condition within a single byte of information.

In an illustrative embodiment of this invention, the information recorded upon each of the tracks may take the form of periodically spaced significant transitions and non-significant transitions disposed therebetween. Means are provided for indicating the occurrence of each transition whether a 0 or a 1 and further, clock means are responsive to the occurrence of the significant transition to provide a clock signal which is used to sample the significant transitions of the recorded information. Error detection means are responsive to the clock signal and to the occurrence of the significant transitions to provide an error indicating signal when a significant transition and a clock signal do not occur in synchronism.

BRIEF DESCRIPTION OF THE DRAWINGS

In the detailed description of the preferred embodiment of the invention presented below, reference is made to the accompanying drawing in which.

DESCRIPTION OF THE PREFERRED EMBODIMENTS

Figure 1:
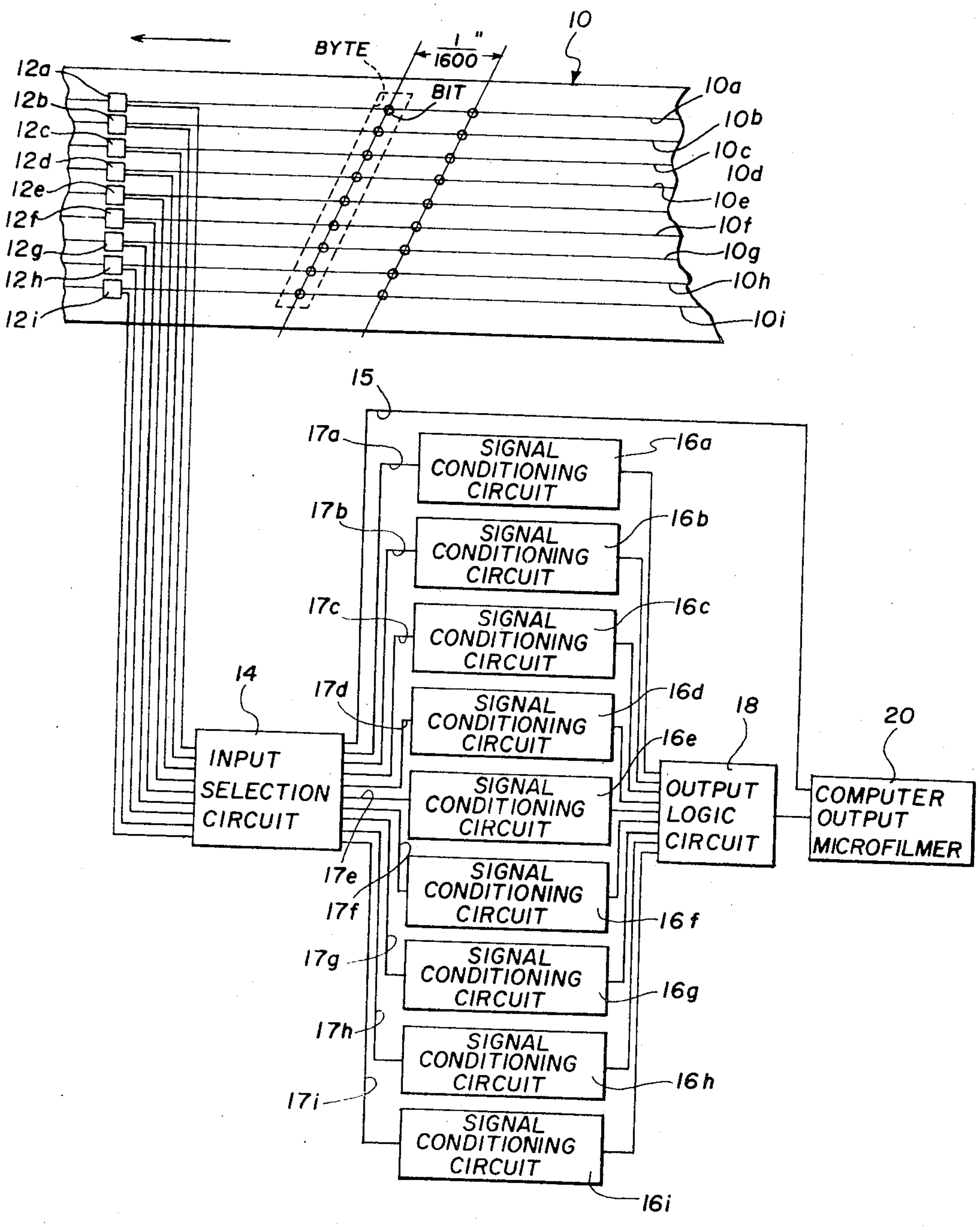
FIG. 1 is a schematic representation of an information handling apparatus in accordance with the teachings of this invention for deriving phase encoded signals from a plurality of tracks of a suitable storage medium and for applying processed signals to a computer output microfilmer.

With regard to the drawing and in particular to FIG. 1, there is shown an information storage medium such as a magnetic tape 10 having a plurality of tracks 10*a* to 10*i* upon which are recorded phase encoded binary signals in the form shown in FIG. 3. A like number of transducers 12*a* to 12*i* are respectively associated with the tracks 10*a* to 10*i* to sense and to generate electrical signals corresponding to the phase encoded signals recorded upon the medium 10. As indicated in FIG. 1, the medium 10 is moved in the direction of the arrow by a suitable mechanism (not shown) so that the successive sets or bytes of information bits are moved past the transducers 12. The sets or bytes of bits are apaced a digit period apart and as illustratively shown in FIG. 1, are spaced 1/1600 inch apart. As shown in FIG. 1, the bits of a single byte may be skewed with respect to the medium 10 and to the direction in which the medium 10 is moved. As discussed above, this relative skewing with respect to the transducers 12*a* to 12*i* presents a problem with regard to the reading out and to the processing of the information recorded upon the medium 10.

As shown in FIG. 1, the transducers 12*a* to 12*i* are connected to an input selection circuit 14. Though not a part of this invention, the input selection circuit 14 operates to direct the various types of signals to their particular interface apparatus. For example, if the input selection circuit 14 is instructed that the medium 10 is encoded with level mode binary non-returned to zero signals (NRZI), these signals may be directly applied over conduit 15 to a utilization station such as a computer output microfilmer 20. Illustratively, the computer output microfilmer 20 may take the form of the KOM–90 computer output microfilmer as manufactured by the assignee of this invention. Such a computer output microfilmer is capable of generating a series of characters upon a cathode ray tube whose image is directed up onto a strip of radiation sensitive medium such as photographic film. If on the other hand, the signals recorded upon the medium 10 are phase encoded signals, the input selection circuit 14 will apply the phase encoded signals along the conduits 17*a* to 17*i* to a plurality of signal conditioning circuits 16*a* to 16*i* respectively. In accordance with the teachings of this invention, the signal conditioning circuit 16*a* to 16*i* operates to sample the significant reversals of the phase encoded signals derived from the medium 10 and to sense the preambles disposed on each of the tracks 10*a* to 10*i*. The phase encoded signals are simultaneously applied from the signal conditioning circuits 16*a* to 16*i* to an output logic circuit 18 which operates in accordance with the teachings of this invention to detect and to correct for error or missing signals in one of the tracks and also to synchronize the simultaneous reading out of the bits of a single byte as stored on the signal conditioning circuits 16*a* to 16*i*. In turn, the corrected, decoded signals are applied from the output logic circuit 18 to the computer output microfilmer 20 where they may be displayed upon a cathode ray tube and recorded upon the strip of microfilm.

In FIG. 2, there is shown one of the nine signal conditioning circuits 16*a* to 16*i*; it may be understood that the other circuits are substantially as that shown in FIG. 2. The phase encoded signals derived from one of the transducers 12 are applied to a pair of threshold detecting circuits 22 and 24. The threshold detecting circuits 22 and 24 serve to detect respectively positive and negative going pulses and to each provide a signal indicative of that type of transition. Although such circuits may take various forms known in the art, they may include a "zero" level detecting circuit which is coupled to a polarity indicating circuit to provide the requisite output. The output signals derived from the threshold detecting circuits 22 and 24 are respectively applied to the *a* input terminals of AND gates 26 and 28 which respectively serve as gates or sampling circuits for the positive and negative reversals of the phase encoded signal. An enabling clock or window sampling signal is derived as will be explained from a sample window clock circuit 25 and is applied to the *b* input terminals of AND gates 26 and 28. Illustratively, the clock circuit 25 may have a duration of 3.0 microseconds at a repetition or cycle rate of 120 KH. With respect to FIG. 3, the clock pulses are periodically generated to include times $t_1$, $t_2$, $t_3$, etc. in order that only significant reversals are sensed and are processed by the signal conditioning circuits 16. The signals gated by the AND gates 26 and 28 are respectively applied to monostable multivibrator circuits 30 and 32, which in response to input signals provide output signals of a fixed pulse width. In turn, the output signals derived from the monostable multivibrator circuits 30 and 32 are applied respectively to the *a* and *b* inputs of OR gate 36 and also to the clear (CL) and preset (PR) input terminals of memory circuit 34.

As is well known in the art, the memory circuit 34, which may illustratively take the form of a latch-type flip-flop circuit, will respond to a 1 signal applied to the clear input terminal (CL) by providing a 1 signal on the Q output terminal and to a 0 signal applied to the preset input terminal (PR) by generating a 0 output signal at the Q output terminal. Thus, a 1 signal will be generated at the Q output terminal of the memory circuit 34 when a positive going pulse is sensed, and a 0 output signal will be provided when a negative going signal is sensed. The 1 and 0 signals derived from the memory circuit 34 are applied sequentially as will be explained to memory circuit 50 to 53 to store four bits of information derived sequentially from the associated track of the medium 10. As will be explained later in detail, the first bit of information will be stored upon the memory circuit 50 with the second, third and fourth bits stored sequentially upon the memory circuits 51, 52 and 53. As shown in FIG. 2, the output signal derived from the Q terminal of the memory circuit 34 is applied to the clear (CL) input terminal of the memory circuits 50 to 53. A counter circuit 46 is provided to apply timing or clock signals to the clock (C) input terminal of the memory circuits 50 to 53 in order to sequentially prepare the memory circuits 50 to 53 to receive and store the signals sequentially generated by the memory circuit 34.

In the course of deriving signals from one of the tracks of the medium 10, there may be instances when one of the flux reversals fails to appear or is missing. This may result from a failure to record the signal in the first instance or from some problem in the playback apparatus such as a speck of dirt interfering with one of the transducers 12. Such missing signals may be termed "weak" or spurious signals, and in accordance with the teachings of this invention, a warning or error signal will be generated by the corresponding signal conditioning circuit 16, which may be applied as described in copending application entitled, APPARATUS FOR DETECTING AND CORRECTING ERRORS IN BINARY INFORMATION RECORDED ON A PLURAL TRACK MEDIUM, to initiate error correcting procedures. As explained in this copending application, binary information may be recorded on information tracks and an additional, parity track may be recorded to provide supplementary information by which weak bits or signals may be corrected. For example, the binary bit in the parity track may be a 1 or a 0 dependent upon whether the number of 1's is even or odd in the other tracks. Thus, if one of the bits is missing, the parity bit may be used to indicate whether the missing bit is a 1 or a 0 signal. If it is known whether the missing signal is a 1 or a 0 and in addition, in which track the weak signal occurred, it is possible to supply the correct missing bit of information.

The signal conditioning circuits 16 are sensitive to the absence of a signal reversal (i.e., a weak signal) to generate an error signal indicative of the presence of a weak signal. With reference to FIG. 2, signals indicative of a positive going transition are derived respectively from the monostable multivibrator circuits 30 and 32 and are applied to the *a* and *b* inputs of the OR gate 36. The OR gate 36 is responsive to the application of either signal, to generate an output signal which is applied to an AND gate 38. Thus, the output signal derived from the OR gate 36 is indicative of a reversal regardless of whether it is negative or positive going. An enabling signal is derived from the clock circuit 25 and applied to the *b* input of the AND gate 38 to provide an output signal which is applied to the clear input terminal (CL) of a "weak" signal memory circuit 40. In normal operation, a "true" signal will be generated by the AND gate 38 and will be applied to the clear input terminal (CL) of the weak signal memory circuit 40. In the absence of a true signal, the weak signal memory circuit 40 will generate a weak or error indicating signal (i.e., a 1 signal) which in turn is applied to the clear input terminals (CL) of a plurality of memory circuits 54 to 57. More specifically, a periodic preset signal is derived from the clock circuit 25 and is applied to the preset terminal (PR) of the weak signal memory circuit 40. In the absence of a true signal derived from the AND gate 38, the periodic preset signal will cause the weak signal memory circuit 40 to provide a 1 or a high signal on its Q output terminal.

In a manner similar to that described above, the weak or error signal will be applied to the memory circuits 54 to 57 in synchronization with the application of the information signals to the memory circuits 50 to 53. More specifically, as explained above, the counter circuit 46 is coupled to the clock input terminals (C) of the memory circuits 54 to 57. As seen in FIG. 2, the counter circuit 46 applies a clock pulse simultaneously to memory circuits 50 and 54, 51 and 55, 52 and 56, and 53 and 57. Thus, if a series of four bits, the last of which is a missing or error bit, is applied to the signal conditioning circuit 16, the first three information bearing bits will be successively stored upon memory circuits 50, 51, and 52. When the error or missing bit is detected, the weak signal memory circuit 40 will generate at the Q output terminal a weak or error signal which will be applied to the memory circuit 57. The memory circuit 54 has received a timing or clock pulse, and upon receipt of the weak or error signal upon its clear input terminal (CL) will change its state to generate a 1 signal at its Q output terminal.

In order to overcome the problem of skewing, it is necessary to receive and store for a period corresponding to the maximum skew between the bits of information making up a single byte, upon each of the signal conditioning circuits 16*a* to 16*i*. As indicated in FIG. 2, each of the signal conditioning circuits 16*a* to 16*i* has a plurality of memory circuits 50 to 53 upon which binary bits from the same bit position from successive bytes are sequentially stored. After the delay period dependent upon maximum skew, the bits stored upon the corresponding set of memory circuits 50, 51, 52 or 53 (one memory circuit in each of the signal conditioning circuits 16*a* to 16*i*) are then simultaneously read out. As shown in FIG. 2, the Q output terminals of the memory circuits 50 to 57 are each connected to one of the inputs of AND gates 60 to 67 respectively. The other input signals for the AND gates 60 to 67 are derived from a counter 78 which serves to sequentially enable and AND gates 60 to 63 and 64 to 67. More specifically, terminals A, B, C and D of the counter 78 are connected respectively to AND gates 60 and 64, 61 and 65, 62 and 66, and 63 and 67. Counter 78 operates to sequentially apply signals at periodic intervals to terminals A, B, C and D in order that AND gates 60, 61, 62 and 63 (and AND gates 64, 65, 66 and 67) are sequentially enabled to read out in that same order the signals stored upon the memory circuits 50, 51, 52, 53 (and the memory circuit 54, 55, 56 and 57). The output signals generated by the AND gate 60, 61, 62 and 63 are applied to the input terminals of an OR gate 70 so that when one of the AND gates 60 to 63 generates an output signal, an output signal will be provided by the OR gate 70. In a similar manner, the output terminals of the AND gates 64 to 67 are applies to the input terminals of an OR gate 72, which responds to one of the output signals derived therefrom to provide an output signal. It may be understood that the terminals A, B, C and D of the counter 78 are connected to the other AND gates corresponding to the AND gates 60 to 67 shown in FIG. 2 in each of the signal conditioning circuits 16*a* to 16*i* so that the bits of a single byte will be read or strobed out simultaneously from each of the signal conditioning circuits 16*a* to 16*i*. Further, if a weak signal appears in one of the bits of a byte, an error signal will be derived from the OR gate 72 in synchronism with the bits being derived from the data output terminals of the other signal conditioning circuits 16. Thus, the particular track upon which the weak signal appears may be identified by which signal conditions circuit 16 generates the weak signal.

With reference to FIG. 1, there is shown in exaggerated form that the bits of a single byte may be skewed with respect to each other and to the direction in which the information storage medium 10 is being directed. Thus, it is necessary to store each bit upon a designated memory circuit in each of the signal conditioning circuits 16*a* to 16*i* a period of time dependent upon the period between the recording of the first bit and the last bit. As will be explained later and as shown in FIG. 2, a delay-master timing circuit 76 is provided to insure a delay between the storage of the signals upon the memory circuits 50 to 57 and the read-out of the signals through the OR gates 70 and 72 and thereby deskew the information bits of a byte. The binary phase encoded information is recorded upon the track of the information storage medium 10 in a series of spaced data blocks including a preamble, a data portion and a postamble. In one illustrative embodiment of this invention, the preamble may include 40 0 signals followed by a 1 signal and the postamble may include a 1 signal followed by 40 0 signals. As mentioned above, the preamble is required so that the clock circuit 25 may be synchronized with the occurrence of the significant reversals and in particular to generate periodic clock signals to enable the AND gates 26 and 28 at times corresponding to the significant (as opposed to the non-significant) reversals.

With respect to FIG. 2, the output terminal of the threshold detection circuit 24 for negative going reversals, is connected to the sample window clock circuit 25 and in particular to a switch 80, which initially is disposed in its first position as shown in FIG. 2. Sample window clock circuits may take various forms known in the art. In accordance with the invention, during the sensing of the preamble, the output signal initially derived from the threshold detection circuit 24 is indicative of the negative going reversals or 0 signals of the preamble and is applied to a one-shot multivibrator circuit 82, which provides in response thereto pulses of a predetermined, fixed length, for example 400 nanosec. The fixed length pulses are applied to reset a counter 84, to reset a variable oscillator 100 and to an integrator circuit 86. During the gap between successive data blocks the variable oscillator 100 is forced to its lowest frequency of operation, approximately 800 kHz in this illustrative embodiment. The first fixed length pulse generated by the multivibrator circuit 82 causes the variable oscillator 100 to increase the frequency of its output signal applied to the counter 84. The counter 84 is responsive to the signal derived from the variable oscillator 100 and is wired to provide an output pulse upon receipt of a given number of input pulses. The counter is, however, still responsive to the oscillator signal and continues to build a cumulative count. The output signal provided by the counter 84 is applied to a decoding circuit 98, which in turn generates at terminal *a* a first aperture or clock signal of defined duration which is applied to the *b* input terminals of the AND gates 26 and 28. The decoding circuit 98 may illustratively include a plurality of AND or OR gates selectively connected to the stages of the counter 84 to remove the aperture signal when the counter 84 reaches a predetermined cumulative count. The first signal derived from the multivibrator circuit 82 causes the oscillator 100, the counter 84 and the decoding circuit 98 to generate the first aperture signal for a time interval within a digit period to normally receive the next significant reversal in the middle of the aperture signal. The counter 84 is wired so that at this time it is reset to a "zero" count.

Normally, the application of the aperture signal at this time would permit the signal generated by the threshold detector circuit 24 to pass through the AND gate 28. However, if the next signal derived from the threshold detector circuit 24 does not arrive so as to be sampled at the substantial midpoint of the aperture gate signal derived from the decoding circuit 98, the frequency of the oscillator 100 will be regulated to either increase or decrease thereby bringing the first aperture gate signal generated by the clock circuit 25 into synchronization with the significant signals derived from the medium 10. This regulation is achieved through negative feed-back, which is proportional to the lead or lag time displacement and which is applied to the input of the integrator circuit 88.

Figure 2A:
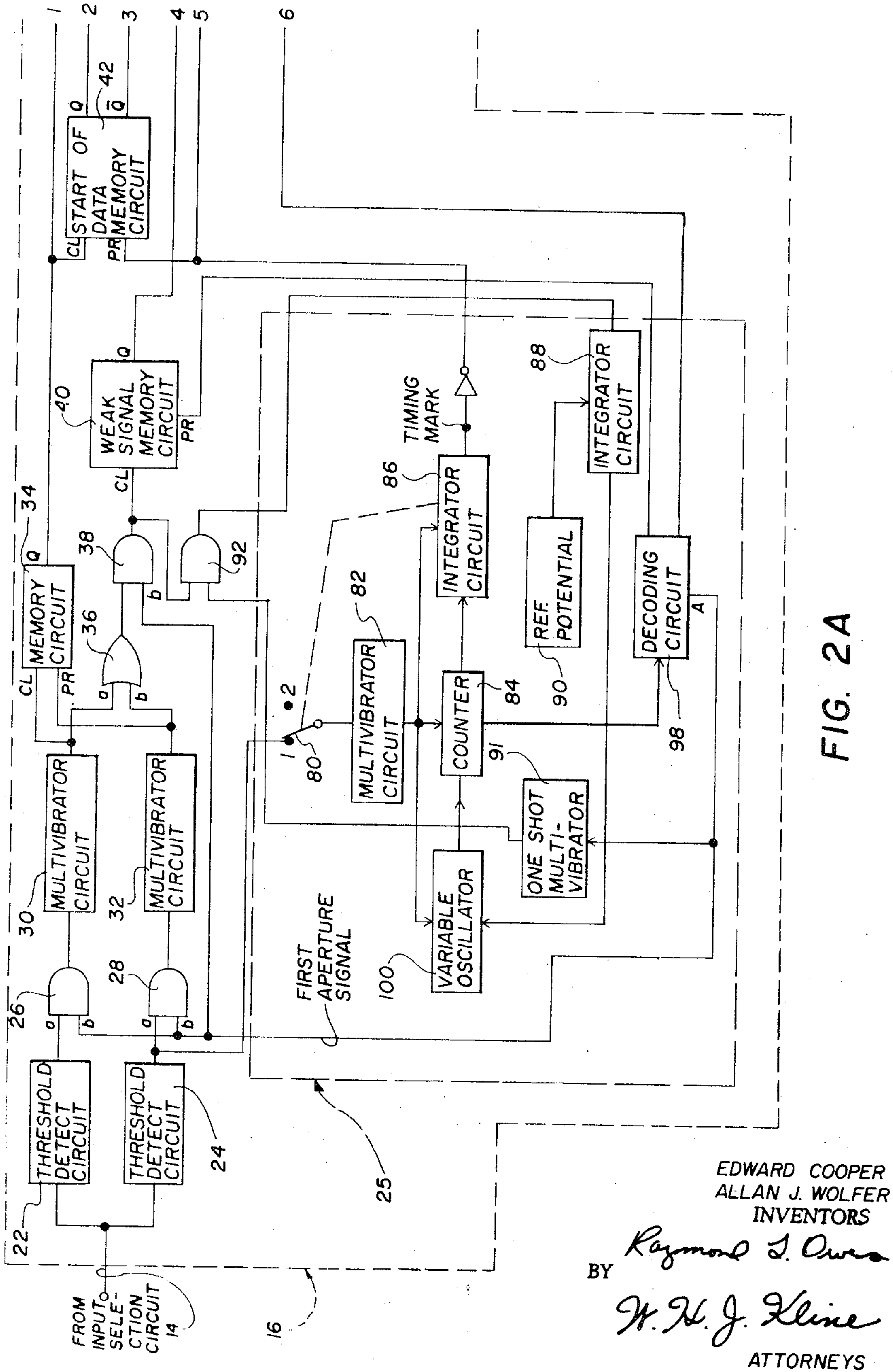
FIG. 2A and 2B when aligned, form FIG. 2 which is a schematic representation of one of the signal conditioning circuits as shown in FIG. 1.
Figure 2B:
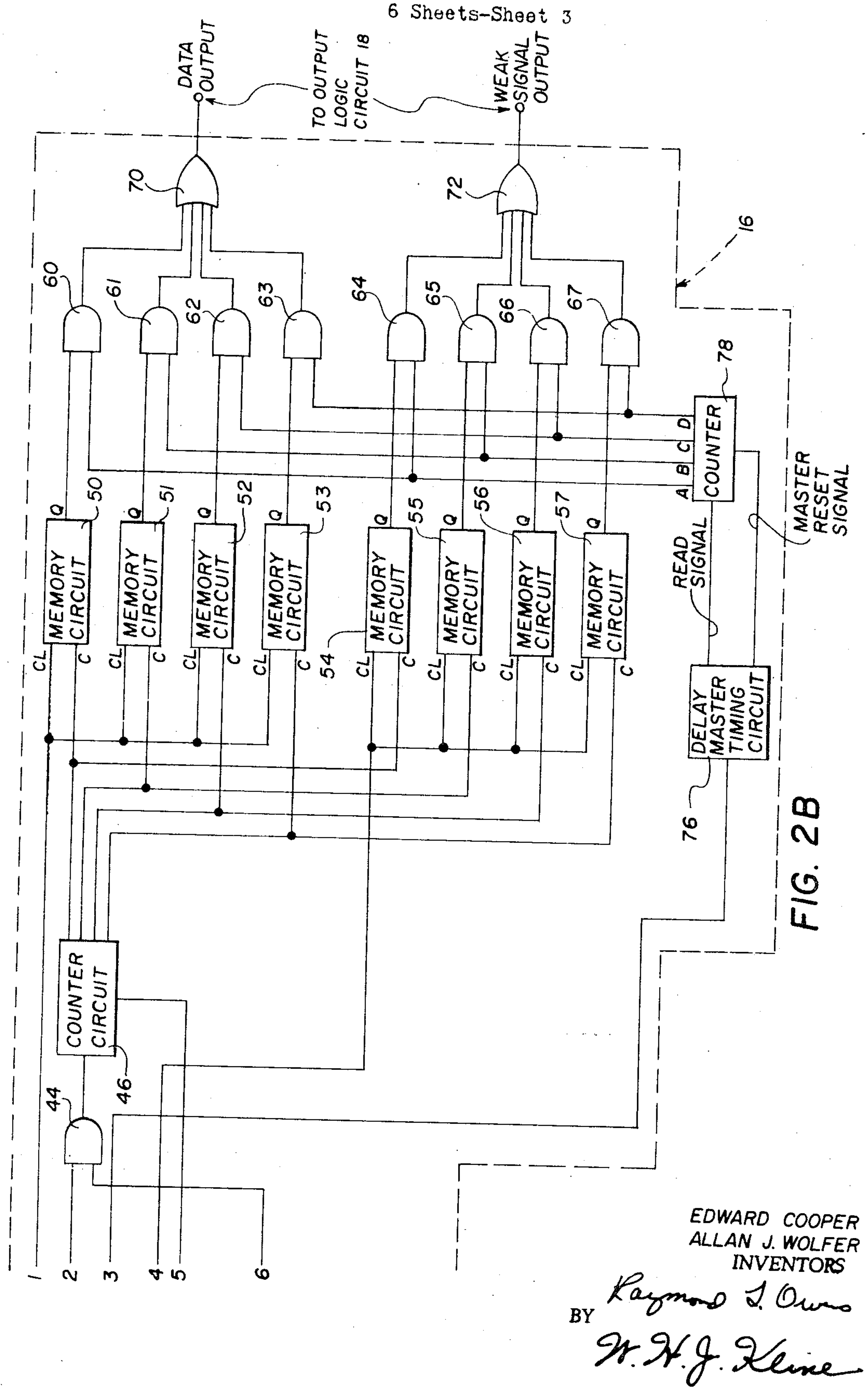

As explained above, the signals derived from the OR gate 36 are indicative of either 1 or 0 signals derived from the corresponding track. During the sensing of the preamble, the signals derived from the threshold detector circuit 24 through the OR gate 36 are indicative of the 0 significant signals and are applied to the AND gate 38. When the first aperture gate signal generated by the decoding circuit 98 is applied to the AND gate 38, the AND gate 38 provides a signal which is applied to an input of an AND gate 92. As shown in FIG. 2*a*, the first aperture signal derived from the decoding circuit 98 is also applied to a one-shot multivibrator circuit 91, which in response to the first aperture gate signal, generates a second aperture gate signal of fixed pulse width less than that of the first aperture gate signal. The second aperture gate signal is applied to the other terminal of the AND gate 92 which serves to limit the maximum change in feedback signal. More specifically, the variable oscillator 100 is operating at a normal frequency so that the aperture gate signals are in synchronism with the significant signals derived from the medium 10, and the AND gate 92 generates an error signal of a normal pulse width with an illustrative length of 1 u second. If frequency of the oscillator 100 is too slow and the first aperture gate signals derived from the circuit 98 are lagging in time with respect to the significant signals derived from the medium 10, the error signal derived from the AND gate 92 will be of a decreased pulse width. If, however, the oscillator 100 is operating at too high a frequency, the generated significant signals will arrive at the AND gate 92 late with respect to the second aperture gate signal; as a result, the error signal generated by the AND gate 92 will be of an increased pulse width.

As shown in FIG. 2*a*, the error signal generated by the AND gate 92 is applied to the integrator circuit 88 which applies a "bias" signal to the variable oscillator 100 to correct or adjust the frequency of the variable oscillator 100. The integrator circuit 88 integrates the pulse width to provide the bias signal indicative thereof. A reference potential source 90 is provided to permit the bias signal derived from the integrator circuit 88 to be adjusted for the particular variable oscillator 100 incorporated in this circuit. In a manner explained above, the frequency of the variable oscillator 100 is adjusted to place the significant signal at the midpoint of the first aperture signals. In this manner the variable oscillator 100 is synchronized with the receipt of the significant reversals of the preamble and is now prepared to receive the input signals of the data portion of the phase encoded signal.

As the variable oscillator 100 of the clock circuit 25 is synchronized with the preamble, the multivibrator circuit 82 applies constant width pulses in response to the 0 pulses of the preamble to the integrating circuit 86. The integrator circuit 86 includes counting means which in effect count the number of pulses received from the multivibrator circuit 82 and upon receipt of a given number, for example 25 pulses, will remove the reset signal from the start of data memory circuit 42 and from the counter circuit 46 to prepare the aforementioned circuits for receiving the data signals. Further, the integrating circuit 86 upon receiving 25 pulses from the multivibrator circuit 82, will effect the switching of the switch 80 from the first to the second position and will also generate a timing or tape mark signal to be used as will be explained later. It is noted that though the switch 80 has been shown in terms of a mechanical switch, that in an illustrative embodiment of this invention, the switch 80 could be a solid state device responsive to an electrical signal generated by the integrator circuit 86. As a result, after the receipt of approximately 25 pulses, the integrator circuit 86 responds to dispose the switch 80 from its first and second position so that the signals derived from the threshold detecting circuit 24 are no longer applied to the multivibrator circuit 82 and that sync pulses are no longer applied to the variable oscillator 100. It may be understood that the sync pulses derived from the multivibrator circuit 82 serve to reset the variable oscillator 100. Thus, during the continued operation of the signal conditioning circuit 16, the variable oscillator 100 is no longer reset by each of the sync pulses derived from the multivibrator circuit 82 but is permitted to generate sustained oscillations whose frequency is continued to be adjusted by the bias signal provided by the integrator circuit 88. During the continued operation of the signal conditioning circuit 16 to process the information bearing portion of the data block, a feedback signal will be generated by the AND gate 92 and that a biasing signal will be applied to the variable oscillator 100 to continue to maintain the frequency of the variable oscillator 100 in synchronization with the significant signals derived from the medium 10. Thus, the clock 25 will continuously adapt itself to the data rate of the bytes after synchronization has been acquired.

During the first 25 0 signals of the preamble, the conditioning signal (i.e., absence of reset signal) is applied by the integrating circuit 86 to the reset terminal of a start of data memory circuit 42 and the counter circuit 46. When the integrator circuit 86 has detected the passage of approximately 25 0 pulses of the preamble, the reset signal is generated to enable the start of data memory circuit 42 and the counter circuit 46 to thereby permit data and weak signals to be respectively stored upon the memory circuits 50 to 53, and 54 to 57 as explained above. As mentioned above, the last signal in the preamble is a 1, which is sensed by the threshold detecting circuit 22. The resulting output signal from the threshold detecting circuit 22 is applied through the enabled AND gate 26 and the multivibrator circuit 30 to the clear input terminal of the memory circuit 34. As the first forty 0 signals of the preamble are applied to the present input of the memory circuit 34, the memory circuit 34 provides corresponding 0 output signals which are applied in turn to the clear input terminal of the start of data memory circuit 42. Upon the occurrence of the first 1 signal of the preamble, the memory circuit generates a 1 signal at its Q output terminal to be applied to the clear input terminal of the start of data circuit 42. The start of data memory circuit 42 is responsive to the 1 signal applied to its clear input terminal (CL) to generate at its Q output terminal a 1 start of data signal (SOD) which is applied to an AND gate 44 (see FIG. 2B). In response to the start of data signal (SOD) and a reference gating signal derived from the decoding circuit 98, the AND gate 44 passes the start of data signal to the counter circuit 46 to thereby intiate the counting operation and the application of the data and weak signals to the memory circuits 50 to 53, and 54 to 57, respectively. It is noted that previously a reset signal had been applied by the integrator circuit 86 to the reset terminal of the counter circuit 46. It may be understood that there are eight other start of data memory circuits similar to circuit 42 disposed in each of the eight information tracks and the parity track of the information storage medium 10. As will be explained later, the start of data signal (SOD) derived from the signal conditioning circuits 16 will be used to synchronize a master delay timing circuit 76 which in turn will control the strobing out of information by the counter 78 of each of the signal conditioning circuits 16.

As explained above with respect to FIG. 2, it is necessary to provide a delay between the first start of data signal and the strobing out of either the data information or the weak signals through the OR gates 70 or 72, respectively. As shown in FIG. 2, a start of data signal is derived from the Q output terminal of the start of data memory circuit 42 and is applied to the master delay-timing circuit 76 which in turn supplies a strobing or read signal and a reset signal to a counter 78. In an illustrative embodiment of this invention, the master delay-timing circuit 76 may provide illustratively a sixteen microsecond delay between the detection of the first start of data signal and the strobing out of the first data information signals to permit the storage on the memory circuits of all the bits relating to a single byte before the information bits are strobed out from each of the signal conditioning circuits 16.

Figure 4A:
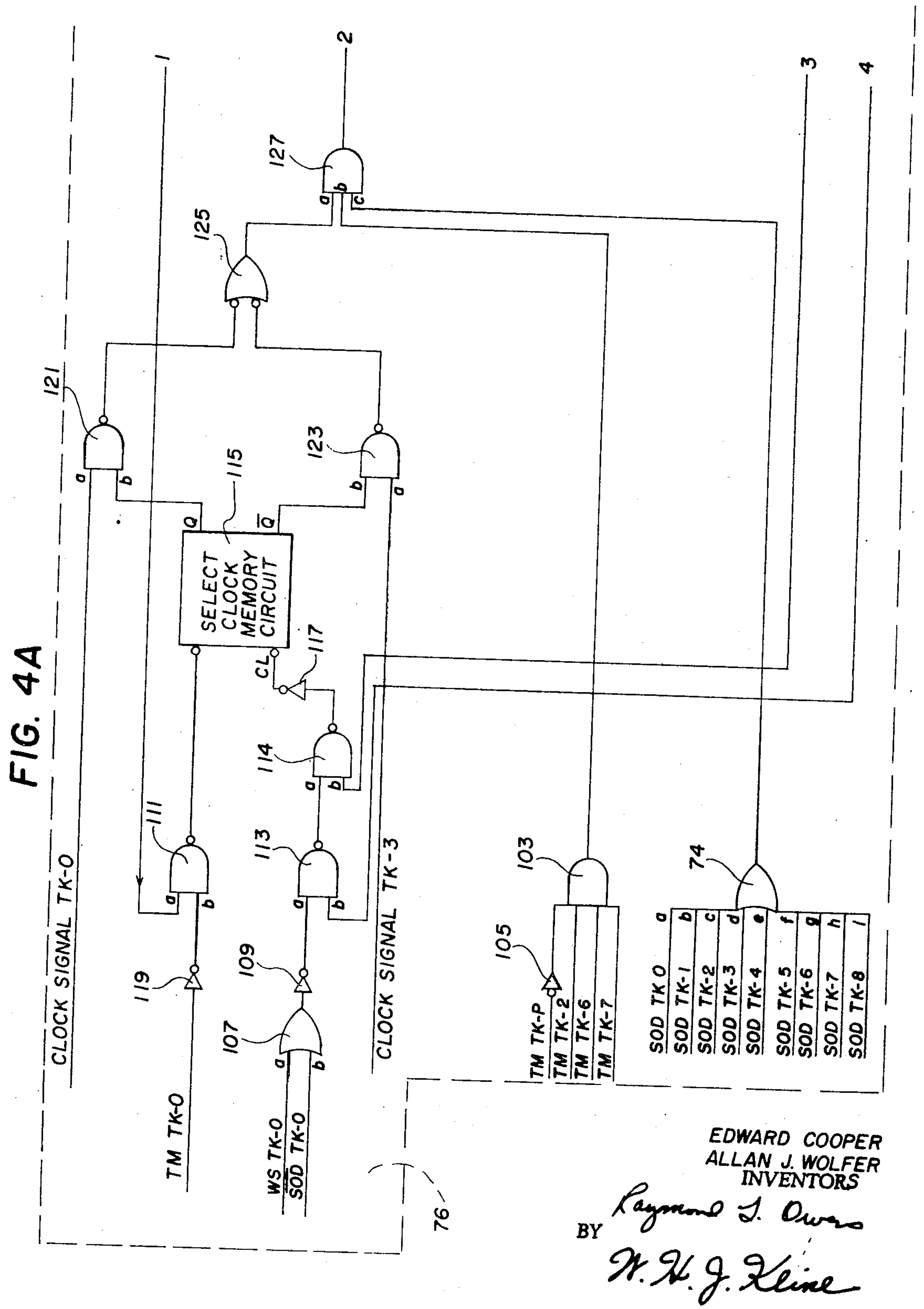
FIGS. 4A and 4B, when aligned, form FIG. 4 which shows schematically a portion of the output logic circuit shown in FIG. 1 and including a master clock circuit for initiating the timing operation in response to the start of data signals derived from each of the plurality of tracks and for providing read signals for "strobing out" in synchronism the information bits stored on the memory circuits of each of the signal conditioning circuits associated with each track.
Figure 4B:
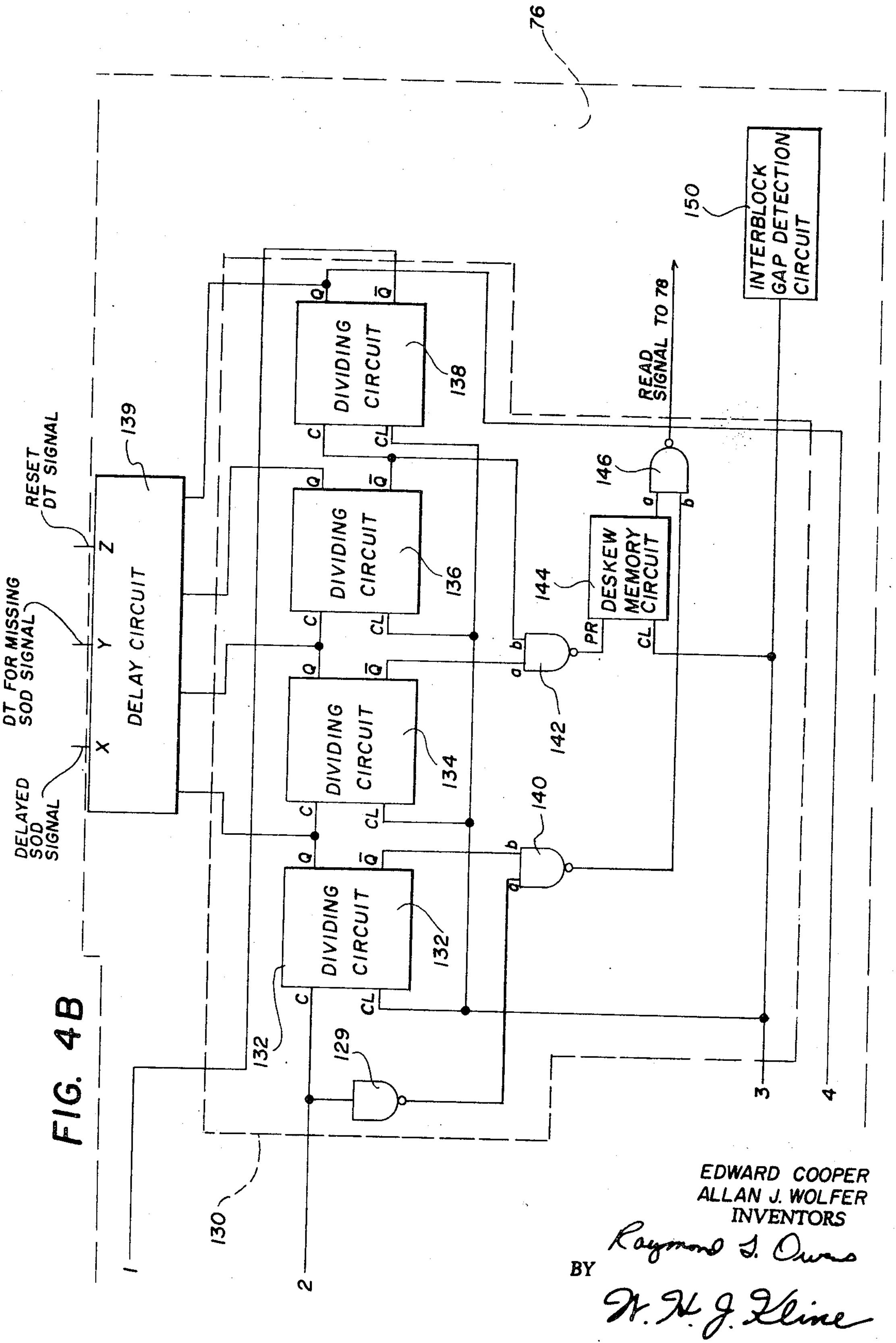

With regard to FIG. 4, there is shown an illustrative embodiment of the delay-master clock circuit 76. As will become evident from the following discussion, the delay-master clock circuit operates 76 to synchronize the various functions of the signal conditioning circuits 16*a* to 16*i* and more specifically to strobe out simultaneously the bits of a single information byte which are stored on a corresponding memory circuit of each of the signal conditioning circuits 16*a* to 16*i*. The master delay-timing circuit 76 includes an OR gate 74 having input terminals *a* to *h*. As indicated on FIG. 4A, the input terminals *a* to *i* of the OR gate 74 of the storage medium 10 are connected to receive the start of data signals derived from tracks 0 to 8. More specifically, the start of data signal derived from the $\overline{Q}$ output terminal of the start of data memory circuit 42 of each of the signal conditioning circuits 16 is applied respectively to the corresponding input terminal of the OR gate 74. Primarily, the OR gate 74 responds to the first start of data signal derived from any of the information or parity tracks of the information storage medium 10 to apply a first start of data or initiate signal to the *c* input terminal of an AND gate 127. The enabled AND gate 127 generates an output signal which is applied to a master clock circuit 130 (see FIG. 4B), which produces a read signal which is applied in turn to the counter circuit 78 (see FIG. 2B) associated with each of the signal conditioning circuits 16a to 16*i*. The AND gate 127 has *a*, *b* and *c* input terminals. The b input terminal is connected to an AND gate 103 which has input terminals *a*, *b*, *c* and *d* for receiving the timing or tape mark signals (TM) generated by the signal conditioning circuits 16 associated illustratively with the parity track, the second track, the sixth track and the seventh track of the medium 10. In recording phase encoded signals on a plurality of tracks, it is normal practice to record an identification mark identifying the type of recording as being phase encoded as opposed to other modes or type of recordings e.g., NRZI. In order to avoid the possibility that the identification mark may be confused with the preamble, the output signal derived from the AND gate 103 is indicative of the absence of the identification mark. More specifically, the particular combination of timing or tape marks derived simultaneously from the parity, second, sixth and seventh tracks of the medium 10 indicate the presence of a phase encoded identification burst. More specifically, the timing mark derived from the signal conditioning circuit associated with the parity track is applied through an inverter circuit 105 to the *a* input terminal of the AND gate 103.

In order to generate a read signal, a clock signal is derived from a selected signal conditioning circuit 16 and is used to synchronize the operations of the entire information handling apparatus. Further, provision is made for the situation in which the clock signal derived from a signal conditioning circuit associated with one track is defective, by providing a suitable switching circuit for applying the clock signal from a second, backup signal conditioning circuit. In the illustrative embodiment shown in FIG. 4, the primary clock signal is derived from the signal conditioning circuit associated with the zero track, and the backup or secondary clock signal is derived from the signal conditioning circuit associated with the third track. Basically, if a weak signal appears in the preamble of the phase encoded signal recorded upon the zero track, the switching circuitry will sense this weak signal and will automatically apply the clock signals derived from the third track to the master clock circuit 130. Similarly, if a weak signal appears in the zero track while data information is being sensed, the switching circuitry will automatically apply the clock signal derived from the third track to the master clock 130.

In the illustrative embodiment shown in FIG. 4, the clock signal derived from the signal conditioning circuit associated with the zero track is applied to the *a* input terminal of NAND gate 121, whereas the clock signal derived from the signal conditioning circuit associated with the third track is applied to the *a* input terminal of NAND gate 123. The enabling signals to be applied to the *b* terminals of the NAND gates 121 and 123 are respectively derived from the Q and $\overline{Q}$ output terminals of a select clock memory circuit 115. Depending upon the state and the output signal derived from the select clock memory circuit 115 either the NAND gate 121 or 123 will be enabled to permit the selected clock signal to be applied to the master clock circuit 130. Further, the output signals derived from the NAND gate 121 and 123 are applied to the inputs of a NOR gate 125, whose output terminal is applied in turn to the *a* input terminal of AND gate 127. Assuming that the absence of an identification burst manifestation is applied to the AND gate 127, the selected clock circuit signal will be applied to the master clock circuit 130.

The state of the clock circuit 115 is determined in the following manner: a timing mark is derived from the integrator circuit 86 of the signal conditioning circuit associated with the zero track and is applied through an inverter circuit 119 to the *b* input terminal of a NAND gate 111 whose output terminal is connected to the preset terminal of the select clock memory circuit 115. The weak signal generated by the weak signal memory circuit 40 of the signal conditioning circuit associated with the zero track is applied to the *a* input terminal of a NOR gate 107, whereas the reciprocal start of data signal ($\overline{SOD}$) derived from the $\overline{Q}$ terminal of the start of data memory circuit 42 is applied to the *b* input terminal of the NOR gate 107. In turn, the output signal derived from the NOR gate 107 is applied through an inverter circuit 109 to the *a* input terminal of a NAND gate 113. An enabling signal is derived from the Q output terminal of a dividing circuit 138 (of the master clock circuit 130, see FIG. 4B) and is applied to the *b* input terminal of the NAND gate 113. The output signal generated by the NAND gate 113 is applied the *a* input terminal of a NAND gate 114. A detector circuit 150 is responsive to the passage of a block between information blocks to generate and apply a master reset signal to the b input terminal of the NAND gate 114. The output signal derived from the NAND gate 114 is applied through an inverter circuit 117 to the clear input terminal (CL) of the select clock memory circuit 115.

The selected clock signal is applied through the AND gate 127 to the master clock circuit 130 which includes as shown in FIG. 4B a plurality of dividing circuits 132, 134, 136 and 138 which may take illustratively the form of flip-flop circuits. In an illustrative embodiment of this invention, the selected clock signal has a frequency of approximately 240 kHz and is applied through the AND gate 127 to the clock input terminal (C) of the dividing circuit 132, which operates to divide the frequency of the selected clock signal by half and to apply a 120 kHz signal from its Q output terminal to the clock input terminal (C) of the dividing circuit 134. Similarly, the dividing circuit 134 provides a 60 kHz signal to the clock input terminal (C) of the dividing circuit 136. The $\overline{Q}$ output terminal of the dividing circuit 136 is connected to the preset terminal (PR) of the dividing circuit 138 to provide a 15 kHz signal. In turn, the Q output terminal of the dividing circuit 138 is connected to the *b* input terminal of the NAND gate 113 (see FIG. 4A). The master reset signal provided by circuit 150 is applied to the clear input terminals (CL) of each of the dividing circuits 132, 134, 136 and 138. As mentioned above, the read signal is delayed until all of the input data signals are stored upon their respective memory circuits; this delay is achieved by a deskew memory circuit 144 whose output terminal $\overline{Q}$ is coupled to the *a* input terminal of AND gate 146. The other input terminal of the AND gate 146 is connected to an AND gate 140 whose input terminals *b* and *a* are respectively connected to the $\overline{Q}$ output terminal of the dividing circuit 132, and through an inverting circuit 129 to the output terminal of the AND gate 127. The preset input terminal (PR) of the deskewing circuit 144 is connected to the output terminal of NAND gate 142 whose input terminals *a* and *b* are respectively connected to the $\overline{Q}$ output terminals of dividing circuits 134 and 136.

Initially during the sensing of the preamble and before the first start of data signal, the weak signal derived from the weak signal memory circuit 40 of the signal conditioning circuit associated with the zero track is a 0 signal. In response thereto, the NOR gate 107 will produce a 0 output signal which will be inverted by the circuit 109 so that a 1 signal is applied to the *a* input terminal of the NAND gate 113. However, the NAND gate 113 is inhibited by a 0 signal derived from the Q output terminal of the dividing circuit 138 and applied to the *b* input terminal of the NAND gate 113. As will become evident later, the signal derived from the Q output terminal dividing circuit 138 remains a 0 until two pulse bit periods have passed after the first start of data signal. During the interblock gap, a master reset signal is generated and is applied to enable the NAND gate 114, which in turn applies a 1 signal to the inverter circuit 117. As a result, the inverter circuit 117 applies a 0 to signal to the clear input terminal (CL) of the select clock memory circuit 115 to clear the circuit 115, i.e., 1 and 0 signals are generated respectively at the Q and $\overline{Q}$ output terminals of the select clock memory circuit 115 to thereby enable the NAND gate 123 and inhibit NAND gate 121. As a result, the clock signal derived from the signal conditioning circuit associated with the third track is applied to the master clock circuit 130 if the other conditIoning signals are applied to enable the NAND gate 127.

At this point in time, the signal conditioning circuits are sensing the preamble of their respective tracks. As explained above, when the integrating circuit 86 of the signal conditioning circuit associated with the zero track, has sensed a predetermined number of pulses in the preamble, a 0 signal (i.e., the timing mark signal TM) is generated by the corresponding circuit 86 and is applied to the inverter circuit 119. In response thereto, the inverter circuit 119 applies a 1 signal to the *b* input terminal of the NAND gate 11. The $\overline{Q}$ output terminal of the dividing circuit 138 applies a 1 signal to the *a* input terminal of the NAND gate 111, and the NAND gate 111 is enabled to apply a 0 signal to the preset input terminal PR of the select clock memory circuit 115. In response to the 0 signal, the select clock memory circuit 115 changes its state so that a 1 signal is derived from the Q output terminal to thereby enable the NAND gate 121 and a 0 signal is derived from the $\overline{Q}$ terminal to thereby inhibit NAND gate 123. Thus, the clock signal derived from the signal conditioning circuit associated with the zero track is allowed to pass through the NAND gate 121, the NOR gate 125 and the AND gate 127 (if the other input conditions of the AND gate 127 have been met) to be applied to the master clock 130. In this manner, the delay-master timing circuit 76 will operate to normally select the clock signal derived from the signal conditioning circuit associated with the 0 track and to apply it to the master clock circuit 130.

However, if a weak signal (i.e., the absence of a significant reversal) appears on the zero track, a 1 signal derived from the $\overline{Q}$ output terminal of the weak signal memory circuit 40 of the signal conditioning circuit associated with the zero track will be applied to the *a* input terminal of the NOR gate 107. In response, NOR gate 107 generates a 0 signal which is inverted by the inverter circuit 109 so that a 1 signal is applied to the *a* input terminal of NAND gate 113. As indicated above, the input signal applied to the *b* input terminal of the NAND gate 113 is derived from the Q output terminal of the dividing circuit 138 which remains a 0 signal throughout the remainder of the processing of information of the information block. In turn, a 1 signal is derived from the NAND gate 113 and applied to the *a* input terminal of the NAND gate 114; the NAND gate 114 applies a 1 signal to the inverter circuit 117 which in turn applies a 0 signal to the clear input terminal of the select clock memory circuit 115. In response to the 0 signal applied to the clear terminal (CL), the select clock memory circuit 115 changes state to provide at its $\overline{Q}$ output terminal a 0 signal to enable NAND gate 123 and to provide at its Q output terminal a 1 signal to inhibit NAND gate 121. As a result, the clock signal derived from the signal conditioning circuit associated with the zero track is no longer applied to the master clock circuit 130 and now as a result of the sensing of the weak signal, the clock signal derived from the signal conditioning circuit associated with the third track is appropriately gated and applied to the master clock circuit 130.

Figure 3A:
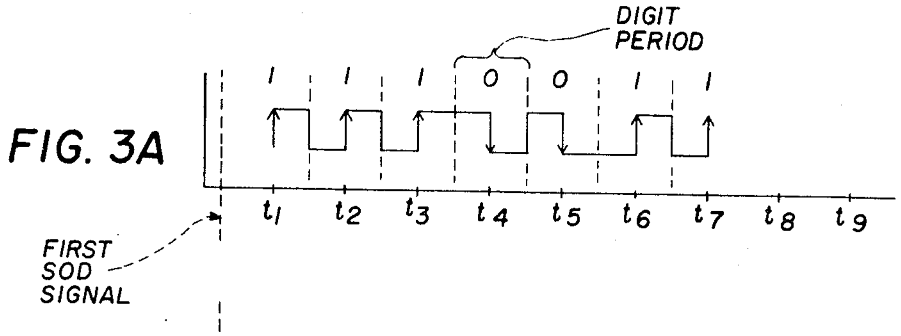
FIGS. 3A thru 3G form FIG. 3 which is a diagram showing the characteristics of a phase encoded signal which is processed in accordance with the teachings of this invention.
Figure 3B:
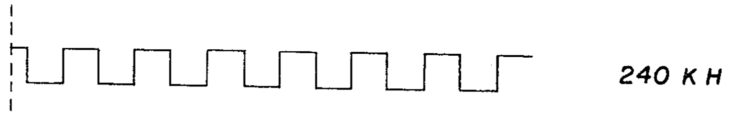
Figure 3C:
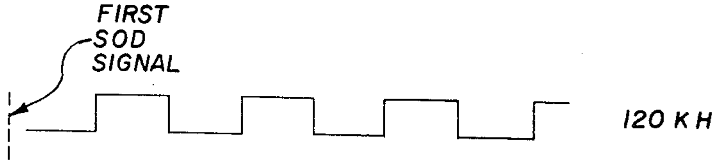
Figure 3D:
Figure 3E:
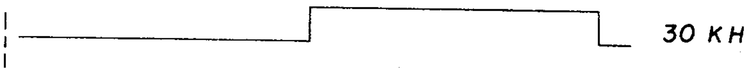
Figure 3F:
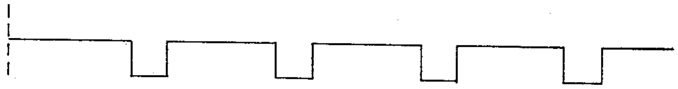
Figure 3G:
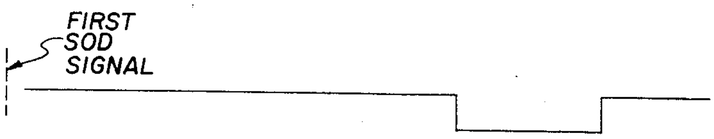

Normally, the AND gate 146 is enabled to permit read pulses generated by the master clock circuit 130 to be applied to each of the counters 78 associated with the signal conditioning circuit 16a to 16i to thereby simultaneously read out the data information stored upon the memory circuits 50 to 53 (and the memory circuits 54 to 57). As explained above, a master reset signal is generated upon the detection of the interblock gap and is applied to the clear input terminals of each of the dividing circuits 132, 134, 136 and 138, and to the clear input terminal of the deskew circuit 144 to thereby dispose the deskew circuit 144 in a clear state and to provide its Q output terminal a 1 signal which inhibits AND gate 147. As a result, until AND gate 146 is enabled, no read signals may be derived from the masterclock circuit 130. In normal operation as explained above, the first start of data signal will be indicated by a signal derived from the nine input OR gate 74, which in turn will enable the passage of a signal derived from the signal conditioning circuit associated with the zero track to be applied to the master clock circuit 130. The selected clock signal is applied to the master clock circuit 130 and more particularly to the inverter circuit 129 whose output signal is shown in FIG. 3*b*. The signal derived from the inverter circuit 129 and applied to the *a* input terminal of the NAND gate 140, has a frequency of 240 kHz. The selected clock signal is also applied to the clock input terminal (*c*) of the dividing circuit 132 which provides at its $\overline{Q}$ output terminal a signal as shown in FIG. 3*c* having a frequency (i.e., 120 kHz) half of that of the signal applied to the clock input terminal. As shown in FIG. 4*b*, the signal derived from the $\overline{Q}$ output terminal of the dividing circuit 132 is applied to the *b* input terminal of the NAND gate 140 whose output signal is shown in FIG. 3f and is applied to the *b* input terminal of the AND gate 146. As explained above, the AND gate 146 is initially inhibited so as to prevent the passing of the signal derived from the NAND gate 140. Further, a signal complementary to that shown in FIG. 3*c* is derived from the Q output terminal of the dividing circuit 132 and is applied to the clock input terminal *c* of the dividing circuit 134, which in turn generates at its $\overline{Q}$ output terminal a signal shown in FIG. 3*c* and having a frequency (i.e., 30 kHz) one half of that applied to its clock input terminal. The signals derived from the $\overline{Q}$ output terminals of the dividing circuits 134 and 136 are applied respectively to the *a* and *b* input terminals of the NAND gate 142. As is well known in the art, the NAND gate 142 will generate a series of 0 pulses in response to the periodic signals generated at the $\overline{Q}$ output terminals of the dividing circuits 134 and 136 as shown in FIG. 3G. The output of the NAND gate 142 is applied to the present input terminal (PR) of the deskew circuit 144 to thereby preset the deskew circuit 144 and to provide a 0 signal at its $\overline{Q}$ output terminal thereby enabling the AND circuit 146. As indicated in FIG. 3G, the enabling 0 pulse is derived approximately two period bits after the first start of data signal has been received from the nine input OR gate 74. As a result, the AND gate 146 will not be enabled and the read signals will not be applied to the counter circuits 78 until the information bits and parity bit associated with the nine tracks of the medium 10 are stored in their corresponding memory circuits. At this time, the AND gate 146 will be enabled as explained above and read signals derived through the NAND gate 140 will simultaneously read or strobe out the information stored upon the corresponding memory circuit of each of the signal conditioning circuits 16*a* to 16*i*. As explained above, the information bits derived from a single track are sequentially applied in the order received first to the memory circuit 50 and then in sequence to the memory circuits 51, 52 and 53 and are read out when the AND gates 60, 61, 62 and 63 are enabled to thereby derive the information output signals. The counter 78 responds to the first input read signal to apply a 1 signal to enable the AND gate 60 thereby permitting the signal stored upon the memory circuit 50 to be applied through the AND gate 50 and the OR gate 70 to the data output terminal. In a similar manner, the counter 78 responds to successive read signals to generate at spaced intervals 1 signals at its output terminals B, C and D to thereby successively enable AND gates 61, 62 and 63. It is understood that each AND gate 60 of the conditioning circuits 16*a* to 16*i* is being simultaneously enabled to thereby read out in parallel the information stored upon the memory circuits 50 of each of the signal conditioning circuits 16*a* to 16*i*. In a similar manner, the information stored upon the memory circuits 51, 52 and 53 of each of the signal conditioning circuits 16*a* to 16*i* will be successively read out.

Thus, there has been disclosed a data processing apparatus for sensing an error condition in signals recorded upon a plurality of tracks of information. Illustratively, the error condition may take the form of a missing transition in a phase encoded signal. Normally, the significant transitions are sensed by a clock signal and are stored upon a plurality of storage devices associated with each of the tracks for a period of time to permit each of the bits of information of a single byte to be read out and stored. In a similar fashion, the signals indicating an error condition within the bits of a single byte are provided and stored upon a second plurality of storage devices. Further, read out means are provided for reading out or deriving from the first and second plurality of storage devices signals corresponding to the bits of information and the signal(s) indicating an error condition within a bit(s) of a single byte of information.

The invention has been described in detail with particular reference to a preferred embodiment thereof, but it will be understood that variations and modifications can be effected within the spirit and scope of the invention.

I claim:

1. In apparatus for deriving and processing phase encoded information recorded in a plurality of tracks on an information storage medium, the recorded information being in the form of bits and corresponding bits in said tracks comprising a byte, the improvement comprising:

a. clock means for providing a clock signal to synchronize the processing of bits in a byte; and b. signal conditioning circuit means adapted to be coupled to the tracks for deriving information bits and including:

i error detection means responsive to the failure to derive an information bit from a track for providing an error signal indicative thereof;

ii. a first plurality of storage devices respectively corresponding to the tracks for storing successive bits of information derived from such tracks;

iii. a second plurality of storage devices respectively corresponding to the tracks and coupled to said error detection means for storing said error signal; and iv. read out means responsive to the clock signal for deriving substantially simultaneously from said first and second plurality of storage devices the information bits comprising a single byte and said error signal.

2. In apparatus for deriving and processing information recorded in a plurality of tracks on an information storage medium, the recorded information being in the form of a plurality of periodically spaced, information bearing transitions and non-significant transitions, corresponding information bearing transitions in said track comprising an information byte, signal conditioning circuit adapted to be coupled to the tracks for deriving information bits comprising:

a. a first plurality of storage devices respectively corresponding to the tracks for storing in the order received successive bits of information corresponding to the significant transitions recorded on such tracks;

b. a plurality of error detection means respectively corresponding to the tracks for determining the presence or absence of a significant transition recorded on such tracks and for providing an error signal indicative of such absence;

c. a second plurality of storage devices respectively corresponding to and coupled to said error detection means of each track for storing in the order received the successive error signals; and d. timing means for deriving substantially simultaneously from said first and second plurality of storage devices the information bits comprising a single byte and the stored error signal(s) indicating the missing transition(s) of that byte.

3. In apparatus for deriving and processing phase encoded information recorded in a plurality of tracks on an information storage medium, the recorded phase encoded information comprising a plurality of periodically spaced information bearing transitions and non-significant transitions disposed therebetween, corresponding information bearing transitions in the tracks comprising a single information byte, the improvement comprising:

a. clock means for providing a plurality of clock signals occurring in synchronization with the information bearing transitions; and b. signal conditioning circuit means adapted to be coupled to the tracks for deriving information bits and including:

i. a first plurality of storage devices respectively corresponding to the tracks for storing in the order received successive bits of information corresponding to the information bearing transitions of the tracks;

ii. a plurality of error detection means, respectively corresponding to the tracks for detecting the absence of a significant transition recorded on such tracks and providing an error signal indicative thereof;

iii. a second plurality of storage devices respectively corresponding to the tracks for storing the error signals;

iv. first timing means associated with the tracks and responsive to the clock signals for applying successively the information corresponding to information bearing transitions recorded in the tracks to said first plurality of storage devices and the error signals to said second plurality of the storage devices; and v. second timing means for deriving substantially simultaneously from the first and second plurality of storage devices signals indicative of the stored information bits comprising a single byte and in timed relationship, error signals indicating missing significant transitions of that byte.

4. Apparatus as claimed in claim 3, wherein said signal conditioning circuit means includes:

first circuit means for providing a first signal indicative of the occurrence of each information bearing transition; and second circuit means responsive to the presence of the clock signals and to the absence of the first signal to provide a second signal indicative of a missing significant transition.

5. Apparatus as claimed in claim 3, wherein the information bearing transitions are indicative of either a 1 or a 0 bit of information and said apparatus includes:

first and second detecting means for respectively generating first and second signals indicative of the presence of 0 or 1 bits of information;

circuit means responsive to either of the first and second signals to provide a third signal indicative of the presence of a significant transition; and circuit means responsive to absence of the third signal and to the presence of the clock signal for providing an error signal indicative of a missing information bearing transition.

* * * * *